United States Patent Office 2,833,837
Patented May 6, 1958

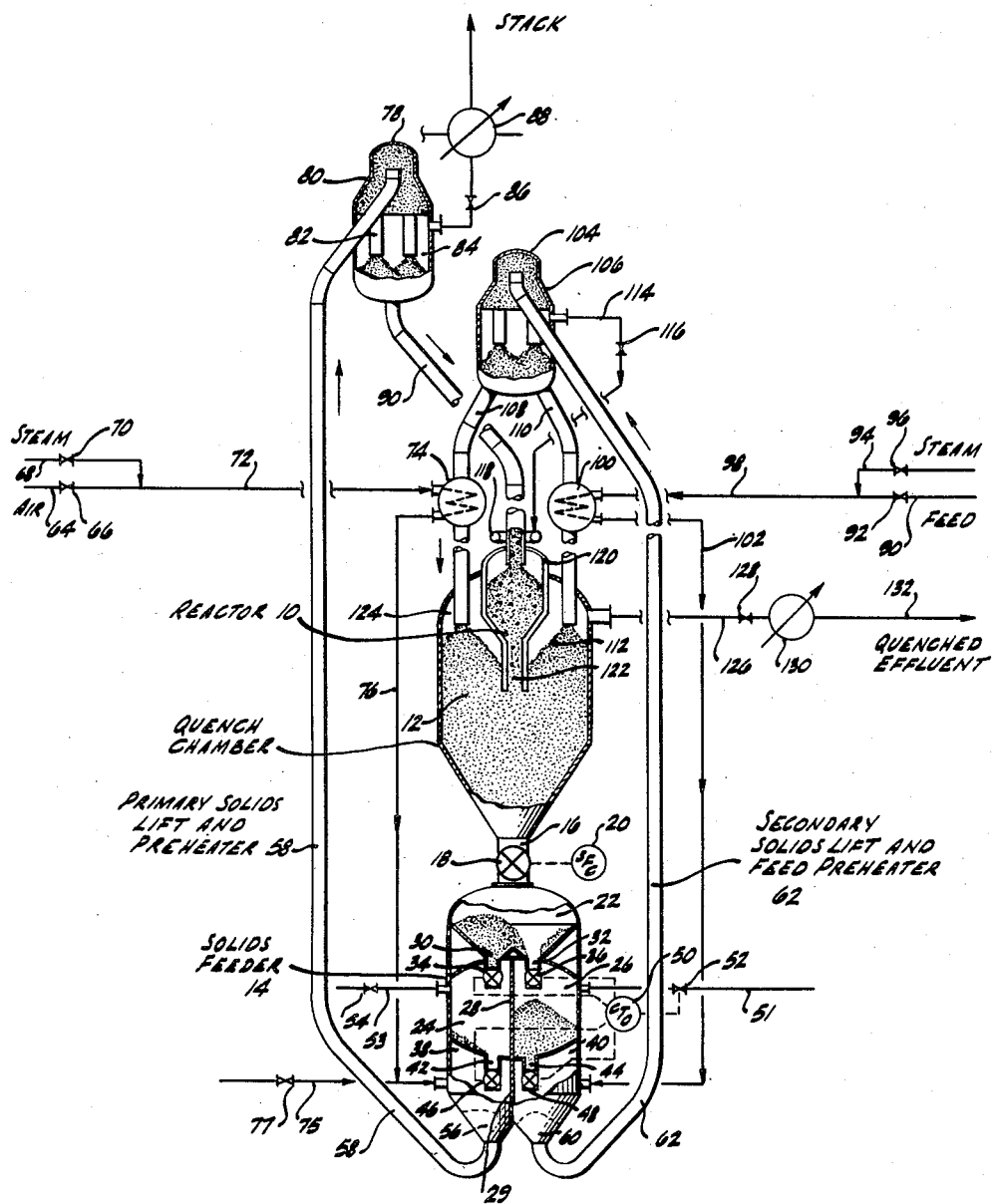

2,833,837

PROCESS AND APPARATUS FOR HIGH TEMPERATURE CONVERSIONS

Clyde H. O. Berg, Long Beach, Calif., assignor to Union Oil Company of California, Los Angeles, Calif., a corporation of California Application July 19, 1954, Serial No. 444,185

15 Claims. (Cl. 260—679)

This invention relates to an improved process and apparatus for conducting high temperature reactions in which unusually high thermal efficiencies are obtained and in particular this invention is directed to an improved process and apparatus for the production of acetylene by thermal cracking through contact with a continuously recirculating bed of solid granular contact material.

In carrying out high temperature conversions, such as the production of acetylene, butadiene, ethylene, and other unsaturated hydrocarbons, and also in other well-known high temperature reactions, it is essential to secure the most rapid heating of the reactants possible, to maintain control over the short reaction time at such superatmospheric temperature, to quench the reaction products to a temperature sufficiently low to terminate the desired reaction and prevent unwanted side reactions from occurring, and to accomplish the foregoing at the highest thermal efficiency possible. By thermal efficiency is meant the ratio of useful utilization of heat to total heat input.

The temperatures involved in the usual high temperature conversions to which the present invention is directed may range from somewhat below 1000° F. to temperatures as high or higher than about 3500° F. In the thermal cracking of hydrocarbons to produce acetylene, the preferable temperatures range as high as 2500° F., and at these temperatures in the conventional processes numerous operational and structural problems have been encountered in the past and which remain unsolved.

The present disclosure is made primarily with respect to the thermal cracking of light hydrocarbons to produce acetylene, but it is to be understood that the process of this invention and the apparatus herein disclosed may be readily adapted and used generally in the carrying out of high temperature reactions by those skilled in the art based upon this description.

The prior art processes for the production of acetylene fall into approximately 5 groups which differ from each other in their fundamental nature. Each has its advantages and disadvantages and none combines all the advantages with none of the disadvantages as does the method and apparatus of the present invention.

The carbide process, by which the majority of acetylene produced in the United States is made, involves the electric arc reduction of calcium carbonate with coke at about 3800° F. to produce calcium carbide which is reacted with water to produce acetylene. The electric power consumption is about 4.8 kilowatt hours per pound of acetylene and the process requires adjacent sources of coke, lime, and cheap electric power, requirements which are not easily met.

The second group includes processes which are essentially electrical in nature and employ electric arcs or silent electrical discharges to heat hydrocarbons such as natural gas to elevated temperatures whereby acetylene is formed by thermal cracking. The electric power requirement is even greater than in the carbide process and runs about 6–7 kilowatt hours per pound of acetylene.

The third process involves partial oxidation of the hydrocarbon feed with oxygen and requires an expensive oxygen plant although the electric power requirement is relatively low. The partial oxidation is conducted at temperatures of the order of 2500° F. and requires an exceedingly complex tubular reactor in which small diameter tubes and high reactant gas velocities are employed to prevent flash backs.

The processes of the fourth group are similar to those in the group immediately preceding except that they involve partial oxidation with air. The oxygen plant is unnecessary but the product gas is highly diluted with nitrogen and contains of the order of 3.5% acetylene compared with from 8 to 10% for the oxygen oxidation process.

The fifth group of processes, of which the present invention is a member, involves regenerative thermal cracking of light hydrocarbon gases to produce acetylene. The most successful process to date appears to be the Wulff process which involves the discontinuous regenerative cracking of propane and lower molecular weight hydrocarbons in a pair of stationary refractory checkerworks maintained at temperatures between about 2200° F. and about 2600° F. One checkerwork is being heated while the other is cracking hydrocarbon feed. The checkerwork reactor is necessarily fairly massive and in order to maintain the requisite short contact times, the Wulff furnace is operated at approximately 0.5 atmosphere absolute pressure and employs a 5 to 1 dilution of the furnace feed with steam. The disadvantages of subatmospheric pressure operation are obvious as is the disadvantage of employing 5 mols of steam per mol of feed. The thermal efficiency of such thermal cracking processes is about 50–60%.

The present invention has successfully overcome the disadvantages of the processes outlined briefly above. It permits the use of inexpensive raw material, the maintenance of optimum reaction temperatures and pressures at or above atmospheric if desired, it is free of steam or other gas dilution problems, it provides for an adjustable residence time in the reactor, it does not require a separate source of oxygen or great quantities of electric power, it does not require the maintenance of a vacuum, it operates at an unusually high heat transfer coefficients and permits the substantially complete recovery of all heat employed, it produces an effluent which is undiluted with steam or nitrogen and has a very high acetylene concentration, it is operated continuously, and it utilizes an apparatus which is simple in construction.

It is accordingly an object of the present invention to provide an improved process for effecting high temperature reactions at exceedingly high thermal efficiencies of the order of 90%.

It is a more specific object of the present invention to provide a continuous, simple, and flexible process for the thermal cracking of light hydrocarbons for the production of acetylene.

It is also an object of the present invention to provide an improved apparatus for accomplishing the foregoing objects.

Other objects and advantages of the present invention will become apparent to those skilled in the art as the description thereof proceeds.

Briefly, the present invention comprises a process for heating fluid streams to very high temperatures for controlled lengths of time to effect heat treating or chemical conversion thereof and following the conversion the hot effluent gases are quenched very rapidly to prevent product decomposition or undesired side reactions from taking place. The process involves a continuously recirculating stream of granular solid contact material consisting of refractory granular solids. These solids are conveyed from the bottom to the top of the apparatus of this invention and passed downwardly therethrough successively through the various chambers and zones by gravity as a downwardly moving compact bed having a bulk density substantially the same as that of the granular solids when at rest.

The granular solids are lifted or conveyed in the process of this invention in the form of an upwardly moving solids bed having a density substantially equal to the downwardly moving bed of solids employed in the reaction zone. The bulk density of the upwardly moving solids bed is substantially the same as the static bulk density of the granular solids when at rest. Granular solids are conveyed in this form through the elongated conveyance conduits in the presence of a relatively high pressure gradient generated by the concurrent flow through the conveyance zone of a conveyance fluid which may be gaseous or liquid, but in the present process is preferably a gas or vapor. The dense or compact solids are conveyed by submerging the inlet opening of the conveyance zone in a mass of granular solids to be conveyed, by maintaining throughout the length of the conveyance zone a pressure gradient $$\frac{dp}{dl}$$

in pounds per square foot per foot which is greater than $$\rho_s \cos \theta$$

(Wherein $\rho_s$ is the static bulk density of the granular solids in pounds per cubic foot and $\theta$ is the angular deviation of the conveyance direction measured from a vertical upward reference axis), and by applying a force against the granular solids discharging from the conveyance zone outlet. The discharge of solids is restricted by the thrust force application without any substantial restriction of the conveyance fluid flow at that point and the fluidization of the solids in the conveyance fluid is prevented. As subsequently shown, the thrust force application is perhaps most easily accomplished by discharging the solids from the conveyance zone against one of the walls of a closed solids-receiving chamber which is kept full of a moving bed of discharged solids. The conveyed solids are removed by gravity from an outlet from the chamber at a rate controlled by a valve or other solids flow control means downstream from the conveyance conduit solids outlet.

Two such conveyance steps are employed in the process of the present invention. Warm granular solids are withdrawn from the bottom of the column in two separate streams. One such stream, the primary solids stream, is conveyed through a primary compact solids conveyance and reheating zone concurrently with a stream of oxygen-containing gas such as air whereby the granular solids are simultaneously conveyed to the top of the system and preheated to temperatures of the order of 2800° F. by absorption of the heat liberated upon combustion of the hydrocarbonaceous or carbonaceous material on the external surface of the granular solid contact material. If this material is insufficient, or absent, entirely, added fuel such as natural gas may be mixed with the air and the primary solids stream conveyed by the burning fuel mixture. The hot gases thus formed are discharged through a heat exchanger to a stack and the hot solids are passed directly into the reaction zone.

The other or secondary stream of solids is passed upwardly as a moving bed through a secondary compact solids conveyance and feed preheating zone concurrently with the reactant in the present process whereby a concurrent heat exchange takes place cooling the solids and heating the feed. The preheated reactant gas is then passed directly into the reaction zone to contact the hot primary stream of solids described previously. The secondary solids stream discharged from the second conveyance zone passes through heat exchange means in which the solids are cooled to a low temperature suitable for quenching the effluent and these solids are introduced directly into a quenching zone which surrounds the lower outlet opening of the reaction zone.

Because of the fact that the solids in the two conveyance and heat exchange zones are in the form of a dense fluid-permeable mass, the ratio of either the weight or the exposed surface area of the solids to the fluid passing therethrough is exceedingly high and of the order of 50–100 times that in a suspended solids system. As a result it is found that during passage of the fluid and solids through the conveyance zones a substantially complete heat exchange takes place, that is, the solids and the fluid are discharged at the same temperature and the heat transfer obtained is extremely effective and rapid.

The granular solids from the reaction zone and those from the surrounding quenching zone are combined in the lower portion of the quenching zone, are removed therefrom as a downwardly moving bed, are pressured in a solids pressuring zone to a pressure substantially greater than those existing in the reaction and quenching zones, and the solids are then divided into the primary and secondary streams mentioned previously and conveyed as described for recirculation in the process.

In the process of this invention as applied to the thermal cracking of hydrocarbon to product acetylene or ethylene, the feed hydrocarbon and the air employed for heating enter the process at temperatures below about 100° F. and the quenched product effluent and the flue gas discharged to the atmosphere are removed from the process at temperatures of the order of 300° F. The thermal efficiency of the process of this invention is thus exceedingly high and has been determined to approximate 90%. These high efficiencies are also realized in other high temperature reactions carried out according to the principles of this invention.

The present invention will be more clearly understood by reference to the accompanying drawing which illustrates an elevation view in partial cross section of the apparatus of this invention and includes a schematic flow diagram of the process. The description of the drawing will be conducted in the form of a practical example of the process of this invention as applied to the thermal cracking of propane to produce acetylene, but it should be understood that the process and apparatus described may be used generally as a tool for conducting superatmospheric temperature reactions requiring short reaction times and rapid product quenching in general, such as the production of hydrogen cyanide, ethylene, hydrogen, nitromethane, acrylonitrile, and the like.

Referring now more particularly to the drawing, the apparatus consists essentially of reactor 10 which opens downwardly in solids and fluid delivery relation at an intermediate point in quench chamber 12, and solids pressuring feeder 14 disposed at successively lower levels. Granular solids, consisting of a mixture of solids from reactor 10 and solids from quench chamber 12 pass downwardly through outlet 16 at an average temperature of about 2000° F. and at a total rate of 11 tons per hour controlled by valve 18 and solids flow controller 20. The solids discharge into upper surge zone 22 of solids feeder 14. Disposed immediately below upper surge zone 22 are first and second pressuring zones 24 and 26 separated by septum 28. Outlets 30 and 32 controlled respectively by valves 34 and 36 open downwardly into pressuring chambers 24 and 26 respectively. Disposed immediately below the pressuring chambers are primary and secondary lower surge chambers 38 and 40 separated by septum 29 and into which granular solids discharge respectively from pressuring chambers 24 and 26 through outlets 42 and 44 controlled by valves 46 and 48. Valves 34 and 46, when closed, thus form the mechanical seals for pressuring zone 24. The same is true of valves 36 and 48 with respect to pressuring zone 26.

Cycle timer operator 50 is connected to valves 34, 36, 46, 48, 52, and 54 and is adapted to open and close them in sequence so that granular solids are passed from upper surge zone 22 into one of the pressuring zones 24 or 26, a fluid under pressure is introduced through lines 51 and 53 controlled by valves 52 and 54 respectively to raise the pressure of fluids present in the interstices of the solids therein, while the solids inlets and outlets of zones 24 and 26, respectively, are mechanically sealed as a result of the valves being closed. The solids are then discharged into either the primary or secondary lower surge zones at a pressure substantially above that at which they were introduced through line 16. The pressuring chamber is then depressured to the quench chamber pressure and refilled with solids.

If desired, a plurality of first and a plurality of second pressuring zones 24 and 26 may be employed and operated in rotation or in a staggered sequence as described so that substantially continuous primary and secondary pressured solids streams enter the primary and secondary lower solids surge zones 38 and 40 within the pressuring solids feeder.

The pressured primary and secondary streams of solids are raised from an operating pressure of 3 p. s. i. g. maintained in the quench chamber 12 to a pressure of about 40 p. s. i. g. for subsequent conveyance. Cycle timer operator 50 operates the valves in sequence so as to maintain a continuous withdrawal of solids from quench zone 12 and a substantially constant delivery of pressured solids into the primary and secondary solids lift systems described below. To accomplish this, of course, the level of solids fluctuates in both the upper surge zone 22 and both of the lower surge zones 38 and 40. As is seen from the drawing, the solids are divided into a primary and secondary stream simultaneously with the solids pressuring step. The primary solids stream passes downwardly from solids accumulation 56 into primary conveyance zone 58 while the secondary solids stream passes downwardly from secondary solids accumulation 60 and is conveyed through secondary conveyance zone 62 as hereinafter more fully described.

Air is introduced through line 64 at a rate of 100 MSCF. per day controlled by valve 66 and is combined with recycled stack gas or steam, if desired, introduced through line 68 at a rate controlled by valve 70. This heating gas then passes through line 72 through heating gas preheater 74 in indirect heat exchange with one portion of the secondary solids stream described above and further described below. The heating gas is preheated to a temperature of about 1400° F. and then passes through line 76 into lower primary surge chamber 38. If desired, fuel gas may be introduced through line 75 controlled by valve 77 for combustion in conveyance and solids heater zone 58. Herein the heating gas under a pressure of about 40 p. s. i. g. depressures concurrently with the primary solids stream from accumulation 56 through primary conveyance zone 58 and within which at least a portion of the hydrocarbonaceous or carbonaceous coating of the solid granular material, and/or the added fuel, is burned generating heat which is stored as sensible heat in the granular material. In this manner the granular solids are preheated simultaneously with conveyance from the bottom to the top of the unit. The compact bed of hot contact material at a temperature of 2800° F. and the spent heating gas are discharged upwardly against roof 78 of primary solids receiving zone 80. The solids are thus thrust against a transverse surface of roof 78 which serves to maintain the solids during conveyance as an upwardly moving solids bed having the solids' static bulk density as described above.

The primary solids stream passes downwardly through downcomers 82 in disengaging zone 84 from which the spent heating gases are removed at a rate of 120 MSCF. per day controlled by valve 86. These gases pass through heat exchanger 88 to recover heat by heating the incoming air after an initial preheat in exchanger 74, and are vented to the atmosphere at a temperature of about 300° F.

The primary solids stream heated to a temperature of about 2800° F. passes downwardly through primary transfer line 90 and is introduced into the top of reactor 10 at a rate of 7.5 tons per hour. The operation of the reactor will be subsequently described.

The feed material, consisting in the present example of propane, is introduced through line 92 at a rate of 336 gallons per hour controlled by valve 92 and is mixed with steam, if desired, flowing through line 94 at a rate controlled by valve 96. This reactant gas mixture then passes through line 98 through interchanger 100 in indirect heat exchange relation with a second part of the secondary solids stream. Herein the reactant gas mixture is preheated to a temperature of about 1400° F. and then passes through line 102 into secondary lower surge zone 40 under a pressure of about 40 p. s. i. g. From this point the secondary solids stream flows concurrently with the thus preheated reactant gas mixture through second solids lift and feed preheater 62 through which the solids flow upwardly as a compact moving bed concurrently with the reactant gas. The granular solids in the secondary stream are discharged upwardly against roof 104 of secondary solids receiving zone 106. The operation of zone 106 is identical to that of zone 80 and the upwardly moving solids are maintained as a mass having the solids' static bulk density.

The secondary solids stream, cooled through direct heat interchange with the reactant gas, is discharged from zone 106 at a temperature of about 1500° F. and is divided into a first and second part. The first part passes downwardly by gravity at a rate of 1.75 tons per hour through first secondary transfer line 108 through heat interchanger 74 wherein the solids are cooled to a temperature of about 425° F. and they are introduced at this temperature into quenching zone 12. The second part of the secondary solids stream passes downwardly at a rate of 1.75 tons per hour through second secondary transfer zone 110 through heat exchanger 100 in which the solids are cooled to about 425° F., and from which the solids are introduced at this temperature into the quenching zone for combination with the first part.

The combined secondary solids stream forms a downwardly moving solids mass having solids level 112 and which immediately surrounds reactor 10. This downwardly moving mass of solids exists at a temperature of about 425° F. and constitutes the quenching medium in which the effluent gases from reactor 10 are rapidly cooled as hereinafter described.

Referring again to solids-receiving zone 106, the preheated reactant gas mixture at a temperature of about 1400° F. is removed therefrom through line 114 controlled by valve 116 and is introduced into reactant gas manifold 118 from which a plurality of streams of the reactant gas mixture is injected into direct contact with the 2800° F. primary solids stream in reactor 10.

Because of the intense temperature, reactor 10 is provided with water jacket 120 through which cooling water is circulated by means not shown for sake of clarity, but conventional in other types of water jacketed equipment.

The preheated reactant gas passes downwardly concurrently with the hot primary solids through reactor 10 and at high velocity through the lower throat 122 thereof. By changing the rate of reactant gas injection into reactor 10, the residence time of the feed in the reactor is variable. In the present example a reaction time of 0.005 second is employed. The concurrent flow of the reactant gas and the hot primary solids stream effectively prevents interference of the solids flow therein by the reactant gas flow. The fact that the granular solids are packed as a compact bed therein provides a minimum of void space and permits a maximum length of reactor for a given flow rate and residence time, a pronounced structural advantage in apparatus for very short contact time reactions.

The converted reactant gas discharges downwardly from the lower end of reactor throat 122 directly into the granular solids mass in quench chamber 12. Herein the reactant gases change direction, flowing first downwardly, then radially outwardly from the reactor nozzle outlet into and upwardly counter-current to the cooled solids in quench chamber 12. The length of throat 122 is made variable so that it may extend further downwardly into quench chamber 12 to provide an independent means for varying the residence time. Within quench chamber 12 the converted gases are quenched to a temperature of below about 800° F. in less than 0.01 second so as to effectively terminate the acetylene-producing reaction and prevent side reactions.

The quenched and cooled converted reactant gases are disengaged through solids level 112 and accumulate in effluent disengaging zone 124 from which they are removed through line 126 at a rate controlled by valve 128 and passed through effluent heat exchanger 130 to recover heat and further cool the effluent. The reactor effluent is then passed to storage or further processing facilities not shown through line 132. In the present example the effluent gas, flowing at the rate of 56 MSCF per day, had the following composition:

| Component: | Mol percent |
|---|---|
| Hydrogen | 56.3 |
| Carbon monoxide | 4.2 |
| Methane | 16.9 |
| Carbon dioxide | 0.6 |
| Acetylene | 14.3 |
| Ethylene | 6.3 |
| Ethane | 0.1 |
| $C_3+$ | 1.3 |
|  | 100.0 |

As can be seen from the foregoing example, the process of the present invention is capable of producing an effluent containing acetylene in an unusually high yield based upon the hydrocarbon feed reacted. In this example the yield amounts to 26 mol percent. The effluent acetylene concentration is high due to the fact that no dilution by nitrogen or steam or other inert gases is involved in the process. The acetylene concentration is usually between about 9 mol percent and about 20 mol percent and the concentration in the foregoing example as listed in the table above is typical.

As applied to the production of acetylene, the present invention may be employed using any low molecular weight hydrocarbon having less than about 5 carbon atoms per molecule, such as methane, ethane, propane, or mixtures thereof such as natural gas as the reactant feed. The temperature of the primary solids stream introduced into the reaction zone may be between 2000° F. and 3500° F. depending upon the nature of the reactant feed. The contact time, or the reactant feed transit time through the bed of solids in the reaction zone, is preferably between about 0.0005 and 0.05 second. The reactant preheat temperature is preferably the maximum which can be attained without premature decomposition of the reactant, and will vary between about 1000° F. and about 1500° F. with different hydrocarbon feed materials. The temperature of the secondary solids stream introduced into the quenching zone is below about 800° F. and preferably is below about 500° F.

Because of the relatively high concentration of acetylene, the effluent fractionation step of this process to recover the acetylene is made considerably simpler than in the conventional processes discussed above. An appropriate fractionation procedure involves a preliminary cooling of the quenched effluent to temperatures approaching that of the atmosphere followed by separation of any condensed material. The uncondensed portion is then contacted with a moving bed of solid granular adsorbent such as activated charcoal in which the ratio of adsorbent to the gas to be separated is controlled so as to adsorb the $C_2$ and higher molecular weight hydrocarbons and to leave methane and lower molecular weight gases substantially unadsorbed. The unadsorbed gases contain considerable quantities of methane and hydrogen which may be recirculated for use as fuel in the process. An intermediate $C_2$ hydrocarbon fraction is rectified from the rich adsorbent by contacting it with a reflux gas containing more readily adsorbable constituents thereby desorbing a side cut fraction containing substantially all of the acetylene product together with ethylene. The rectified adsorbent is then heated and stripped of $C_3$ and any higher molecular weight hydrocarbons as a rich gas which may then be recirculated as feed or fuel in the process of the present invention. Preferably these materials are recirculated together with fresh feed for further reaction.

The acetylene-containing fraction is treated by solvent extraction or absorption to separate the acetylene from ethylene. The acetylene is ordinarily found in the extract or the rich solvent and is recovered therefrom in substantially pure form by any of the conventional solvent or extract stripping procedures. The unabsorbed material constitutes principally ethylene which may be produced as a separate product of the process if desired.

It is to be pointed out that the above-described process and apparatus, while being exceedingly well adapted to the production of acetylene by thermally cracking light hydrocarbons, also has general utility in the conducting of relatively fast and high temperature reactions to produce such products as ethylene, butadiene, and other hydrocarbon products, to the thermal cracking of heavier petroleum hydrocarbon fractions at high temperatures by direct contact with highly heated solid materials such as, for example, in contact coking of heavy oils, shale oil coking or cracking, and the like. Such high temperature short contact time reactions are well-known and will occur to those skilled in the art from the above description. Several examples of typical processes are given below.

*Example II*

A straight-run naphthenic gasoline having a boiling range of from 170° F.–220° F., flowing at a rate of 4.62 gallons per hour, is preheated and vaporized and introduced into the reaction zone to contact granular coke at temperatures ranging from 2200° F.–3400° F. A reaction time of 0.024 second is employed. The effluent is quenched from an average reaction temperature of about 1500° F. to temperatures below about 850° F. and is produced from the system at a rate of about 1210 s. c. f. per hour. The product gas contains 4.17% by volume of butadiene.

*Example III*

In the production of ethylene, gaseous ethane of about 95% purity is introduced at a rate of 2820 s. c. f. per hour into the reaction zone to contact therein a moving bed of granular alumina previously heated to a temperature of 1950° F. The contact time is maintained at 0.01 second and the effluent gases are quenched through contact with the secondary stream of cold granular alumina to temperatures below about 400° F. The product gas contains 37% by volume of ethylene and 11% by volume of unconverted ethane. The ethane conversion to ethylene amounts to about 86%.

*Example IV*

A heavy fuel oil having an A. P. I. gravity of 12° is preheated to a temperature of 475° F. and is introduced at a rate of 8 gallons per hour into the reaction zone to contact a recirculating stream of equilibrium coke which has been previously heated to a temperature of about 1000° F. A contact time of about 2 seconds is employed and the effluent coker distillate is quenched to a temperature of about 850° F. by countercurrent contact with the secondary stream of cold coke in the quenching zone. The quenched effluent is removed and condensed giving a liquid yield of about 87%.

The foregoing examples illustrate the general utility of the process and apparatus of this invention in the effecting of various relatively high temperature reactions in which short contact times are beneficial.

In the apparatus of the present invention it is preferred that the main high temperature reactor be provided with a water jacket and be constructed of alloy steel to protect it from the high temperatures involved. The transfer lines through which highly heated granular solids are conveyed are also preferably constructed of such alloy steel, and may be internally insulated through the use of a smooth ceramic lining or the like and finned externally to assist in protecting the tube and vessel walls from adverse temperature effects at the points in the apparatus where the temperatures are highest. The remaining portions of the apparatus may be satisfactorily constructed from mild steel.

The granular solid contact material employed in the process of this invention may be naturally occurring or specially manufactured refractory or high temperature resistant materials. The solid contact material may be in the form of fragments or granules which have been screened to provide a fairly uniform mesh size range and a preferred form of the contact material comprises semispherical manufactured refractories presently commercially available. A partial list of materials which may be employed include porcelain, or other ceramics, mullite, granular coke preferably produced by contact coking, metal balls such as those of high melting point metals, stainless steel and other temperature resistant alloys, the various refractory oxides such as those of aluminum, calcium, magnesium, zirconium, and the like, the carbides including those of silicon and tungsten, granular quartz, graphitic materials of the well-known types, treated temperature-stable clays, and in general any refractory granular material capable of withstanding the particular extreme temperature employed in a given process to which the principles of the present invention are applied.

The mesh size range of granular solids suitable for use in the process range from a minimum of about 40 mesh. Granular solids ranging from 1/8 inch to 2 inches average diameter may be employed and satisfactory mesh range lies between about 3/8 inch and about 3/4 inch average diameter.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for conducting high temperature reactions at very short controlled contact times which comprises establishing a reaction zone communicating with a surrounding quenching zone, passing a primary stream of hot granular solids downwardly by gravity as a moving bed through said reaction zone and into said quenching zone, passing a secondary stream of cold granular solids downwardly by gravity as a moving bed around and below said reaction zone through said quenching zone, removing said solids as a mixed stream from said quenching zone, dividing said mixed stream into said primary and said secondary streams, separately raising the pressure of fluids present in the interstices of said primary and secondary solids streams in separate mechanically sealable solids pressuring zones, passing the pressured primary stream of said solids through a primary solids conveyance and heating zone as an upwardly moving bed concurrently with a heating and conveyance fluid forming said primary stream of hot granular solids, passing the pressured secondary stream of said solids through a secondary solids conveyance and cooling zone as an upwardly moving bed concurrently with a cooling fluid forming said secondary stream of cold granular solids, applying a force against the primary and secondary solids streams discharging respectively from the outlets of said primary and secondary solids conveyance zones to maintain the solids therein as upwardly moving beds having substantially the solids' static bulk density to permit substantially complete heat transfer between the fluid and said solids, passing a reactant fluid into and through said reaction zone in direct concurrent contact with said primary stream of hot solids to react said fluid wherefrom it passes into and through said quenching zone in direct countercurrent contact with said secondary stream of cold solids to terminate the reaction, and removing the effluent from said quenching zone.

2. A process according to claim 1 in combination with the step of preheating said heating and conveyance fluid prior to introduction into said primary solids conveyance and heating zone by passing said fluid in indirect heat exchange relation with at least part of said secondary solids stream prior to introduction of said solids into said quenching zone.

3. A process according to claim 2 wherein said heating fluid is an oxygen-containing gas and combustible materials are burned from said primary solids stream in said primary solids conveyance and heating zone to heat and convey said solids therein.

4. A process according to claim 2 wherein said heating fluid is a mixture of an oxygen-containing gas and a fuel which burns within said primary solids conveyance and heating zone to heat and convey said solids therein.

5. A process according to claim 1 in combination with the step of preheating said reactant fluid by passing it successively in indirect heat exchange relation with at least part of said secondary solids stream, then concurrently with said secondary solids stream through said secondary solids conveyance and cooling zone as said cooling fluid, and then into said reaction zone.

6. A process according to claim 1 wherein the fluid pressure in the interstices of said mixed solids stream is raised by the steps of passing said mixed solids stream from said quenching chamber into an upper solids surge zone at a relatively low pressure, passing solids therefrom in rotation into each of a plurality of primary and secondary solids pressuring zones, mechanically sealing the solids inlets and outlets thereof, introducing a fluid under pressure into each of said pressuring zones after solids have been introduced thereinto and while said inlets and outlets are sealed, then discharging the thus pressured solids from each of said primary and secondary pressuring zones respectively into a primary and secondary lower solids surge zone, then depressuring each of said pressuring zones to receive additional solids from said upper solids surge zone, removing said primary and said secondary solids streams respectively from said lower primary and secondary solids surge zones for conveyance and heat exchange in said primary and secondary conveyance zones, and filling, pressuring, emptying, and depressuring each of said solids pressuring zones in staggered sequence to maintain substantially continuous flows of solids from said upper solids surge zone and into said primary and secondary lower solids surge zones.

7. A process for the conversion of hydrocarbons in the presence of a moving bed granular solid contact material at high temperature and at short controlled contact times which comprises passing a primary stream of hot solids as a moving bed downwardly by gravity through a reaction zone surrounded by a quenching zone and into said communicating quenching zone at an intermediate point therein, passing a secondary stream of cold solids as a moving bed downwardly by gravity through said quenching zone around said reaction zone forming a warm mixed solids stream in the lower portion thereof, passing a preheated reactant hydrocarbon feed downwardly concurrently with said primary solids stream in said reaction zone for reaction therein forming a reaction product which flows therefrom at said intermediate point directly into a countercurrent contact with said secondary stream of cold solids in said quenching zone to quench said reaction product, removing the quenched product from the top of said quenching zone, passing the warm mixed solids stream therefrom at a substantially constant rate into an upper solids surge zone, removing a primary and a secondary solids stream intermittently therefrom, passing each solids stream into and through at least one primary and secondary solids pressuring zone respectively, raising the pressure of fluids in the interstices of the primary and the secondary solids in said primary and secondary solids pressuring zones respectively while the solids inlets and outlets thereof are mechanically sealed from the adjacent surge zones, passing the pressured primary solids stream into and through a primary lower solids surge zone and therefrom upwardly as a dense moving bed through a primary conveyance and solids heating zone by means of a concurrent flow of a conveyance and heating fluid to form said primary stream of hot solids, passing the pressured secondary solids stream into and through said lower solids surge zone and therefrom upwardly as a dense moving bed through a secondary conveyance and solids cooling zone by means of a concurrent flow of a conveyance and cooling fluid, applying a force against the beds of solids discharging at the outlet of each of said conveyance zones to maintain said solids therein as a moving mass having substantially the solids' static bulk density, disengaging said conveyance and heating fluid from said primary stream of hot solids, introducing said hot solids by gravity into said reaction zone, disengaging said conveyance and cooling fluid from said secondary stream of solids, and passing said solids by gravity into said quenching zone to quench said reaction product.

8. A process according to claim 7 wherein said granular solid contact material discharged from said reaction zone contains a combustible hydrocarbonaceous deposit, in combination with the steps of adding to said conveyance and heating fluid an oxygen containing gas, controlling the flow rate and oxygen concentration thereof whereby said primary solids stream is simultaneously conveyed and heated to form said primary stream of hot solids during passage through said primary solids conveyance and heating zone by combustion of said hydrocarbonaceous deposit from said primary solids stream.

9. A process according to claim 7 in combination with the steps of adding to said primary conveyance and solids heating fluid an oxygen-containing gas, and a fuel gas, and controlling the rates and concentrations to produce said primary hot solids streams by passage of said gases through and combustion thereof in said primary conveyance and heating zone.

10. A process according to claim 7 wherein said primary conveyance and heating fluid is passed in indirect heat exchange relation with at least a portion of said secondary solids stream prior to the introduction of said solids into said quenching zone and prior to introducing said conveyance and heating fluid into said primary conveyance and heating zone.

11. A process according to claim 7 wherein said secondary conveyance and cooling fluid comprises the hydrocarbon feed, in combination with the steps of passing said feed in indirect heat exchange relation with at least a portion of said secondary solids stream prior to passage of said hydrocarbon feed through said secondary conveyance and cooling zone as said secondary conveyance and cooling fluid, and then passing the disengaged secondary conveyance and cooling fluid as said preheated hydrocarbon reactant feed into said reaction zone.

12. A process according to claim 7 wherein said hydrocarbon feed comprises a low molecular weight hydrocarbon having less than about 5 carbon atoms per molecule, in combination with the steps of controlling the temperature of said primary solids stream entering said reaction zone to between about 2000° F. and 3500° F., controlling the contact time of said feed in said reaction zone to between about 0.0005 and about 0.05 second, controlling the temperature of said preheated hydrocarbon reactant to between about 1000° F. and about 1500° F. but insufficient to cause premature reaction, controlling the temperature of said secondary stream of cold solids introduced into said quenching zone to below about 800° F., and wherein the effluent from said quenching zone is an acetylene-containing gas.

13. An apparatus for contacting a fluid with high temperature granular solid contact materials at short contact times which comprises a reaction chamber having a lower outlet opening of restricted cross section, an inlet conduit for reactant fluids opening into the top thereof, a quenching chamber surrounding said reaction chamber and connected at an intermediate point in solids and reaction chamber effluent receiving relation therewith, an outlet conduit for solids opening from the bottom of said quenching chamber, an outlet conduit opening from the top thereof for the effluent fluids, means connected in solids receiving relation to the bottom of said quenching chamber for dividing said solids into a primary and a secondary stream, separate primary and secondary solids pressuring means connected in solids receiving relation to said last named means and adapted for raising the pressure of fluids in the interstices of said solids streams, an elongated primary solids conveyance and heating conduit connected in solids receiving relation to the bottom of said primary solids pressuring means, means for passing a primary conveyance and heating fluid concurrently with solids therefrom through said conveyance and heating conduit to convey and heat said primary solids stream simultaneously, a solids receiving means for disengaging said fluid from said primary solids stream at the outlet of said conveyance and heating conduit means for introducing said primary solids stream from said solids receiving means as a moving bed into the top of said reaction chamber, an elongated secondary solids conveyance and cooling conduit connected in solids receiving relation to the bottom of said secondary solids measuring means, means for passing a secondary conveyance and cooling fluid therefrom through said cooling conduit to convey and cool said secondary solids stream simultaneously, solids receiving means for disengaging said fluid from said secondary solids stream at the outlet of said cooling conduit, and means for introducing said secondary solids stream from said solids receiving means as a moving bed into the top of said quenching chamber around said reaction chamber.

14. An apparatus for the high temperature contacting of fluids with a granular solid contact material which comprises a reaction chamber opening downwardly into and at an intermediate point in a quenching chamber, said quenching chamber surrounding at least the lower part of said reaction chamber, a solids inlet at the top of said reaction chamber, a solids inlet at the top of said quenching chamber, a reactant inlet opening into the top of said reaction chamber and an effluent outlet opening from the top of said quenching chamber whereby said reactant flows downwardly concurrently with solids through said reaction chamber into said quenching chamber, then laterally and then upwardly countercurrent to solids therein to said effluent outlet, a pressuring solids feeder vessel connected in solids-receiving relation with the bottom of said quenching chamber and provided with an upper solids surge chamber, at least one primary and at least one secondary solids pressuring chamber each communicating in solids-receiving relation with said upper solids surge chamber through valved conduits, a lower primary and a lower secondary solids surge chamber communicating in solids-receiving relation respectively through valved conduits with said primary and said secondary solids pressuring chambers, a valved conduit for pressuring fluid opening into each of said pressuring chambers, instrument control means for actuating the valves in said valved conduits in sequence to pressure a primary and a secondary stream of solids from said upper solids surge chamber at a relatively low pressure respectively into said primary and secondary lower solids surge chambers at relatively high pressures, an elevated primary solids separator chamber, an elongated primary solids conveyance and heating conduit connecting said lower primary solids surge chamber therewith, an elevated secondary solids separator chamber, an elongated secondary solids conveyance and cooling conduit connecting said lower secondary solids surge chamber therewith, a primary solids transfer line communicating the bottom of said primary separator with said reaction chamber solids inlet, a plurality of secondary solids transfer lines communicating the bottom of said secondary solids separator through a first and second heat exchanger means with said quenching chamber solids inlet, an inlet conduit for a primary solids conveyance and heating fluid opening into said first heat exchanger means, an outlet conduit therefrom opening into said primary lower solids surge chamber whereby said fluid flows therefrom through said primary solids conveyance and heating conduit, an outlet conduit for said fluid opening from said primary separator chamber, an inlet conduit for a reactant fluid opening into said second heat exchanger means, an outlet conduit therefrom opening into said secondary lower solids surge chamber whereby said fluid flows therefrom through said secondary solids conveyance and cooling conduit, and an outlet conduit for said fluid opening from said second separator chamber communicating with said reactant inlet at the top of said reaction chamber, the outlet openings of said primary and secondary conveyance conduits being disposed respectively in said primary and secondary separator chambers so as to restrict the discharge of the solids therefrom so as to maintain said solids therein as dense upwardly moving masses having substantially the solids' static bulk density.

15. An apparatus according to claim 14 in combination with an inlet conduit for fuel communicating with the inlet opening of said primary solids conveyance and heating conduit.

References Cited in the file of this patent

UNITED STATES PATENTS

| | | |
|---|---|---|
| 2,513,294 | Eastwood et al. | July 4, 1950 |
| 2,526,652 | Garbo | Oct. 24, 1950 |
| 2,548,286 | Bergstrom | Apr. 10, 1951 |
| 2,606,861 | Eastwood | Aug. 12, 1952 |
| 2,643,216 | Findlay | June 23, 1953 |
| 2,661,321 | Schutte | Dec. 1, 1953 |
| 2,673,786 | Alleman | Mar. 30, 1954 |
| 2,684,390 | Bills | July 20, 1954 |
| 2,684,930 | Berg | July 27, 1954 |